July 21, 1925.

R. S. BLITZ

TIRE CHAIN

Filed July 18, 1924

1,546,430

WITNESSES

INVENTOR

R. S. Blitz.

BY

ATTORNEYS

Patented July 21, 1925.

1,546,430

UNITED STATES PATENT OFFICE.

RALPH SYLVESTER BLITZ, OF PHILIPSBURG, MONTANA.

TIRE CHAIN.

Application filed July 18, 1924. Serial No. 726,802.

*To all whom it may concern:*

Be it known that I, RALPH SYLVESTER BLITZ, a citizen of the United States, and a resident of Philipsburg, in the county of Granite and State of Montana, have invented certain new and useful Improvements in Tire Chains, of which the following is a specification.

This invention relates in general to tire chains and more particularly to the interlocking arrangements employed for releasably securing the ends of the side chains together when the chain is mounted on the tire.

The object of the invention is to provide a simple and reliable interlocking arrangement of this character which may be depended upon to secure the chain in position on the tire while being readily releasable when it is desired to remove the chain from the tire.

A further object is to provide an interlocking arrangement of this character and having these advantages and which is also adjustable to provide for the necessary take up of the chain to compensate for stretching of the chain or wear of the tire.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1:
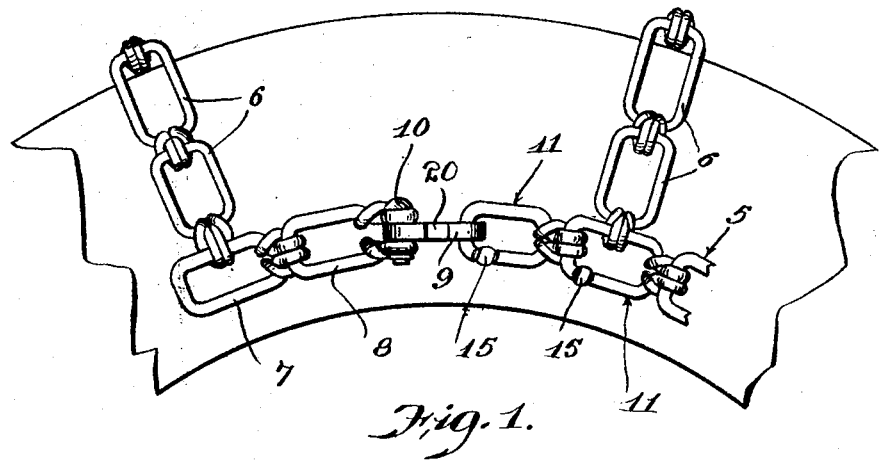
Figure 1 is a fragmentary view in side elevation, showing the invention applied on an automobile tire.
Figure 2:
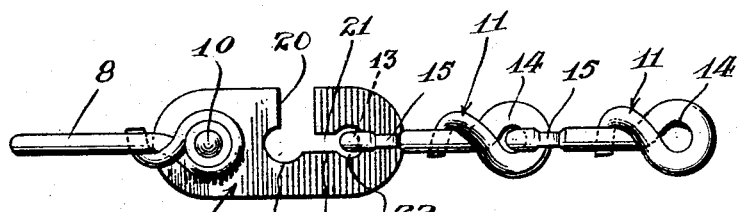
Figure 2 is a detail view in side elevation of the interlocking hook and adjacent links.
Figure 3:
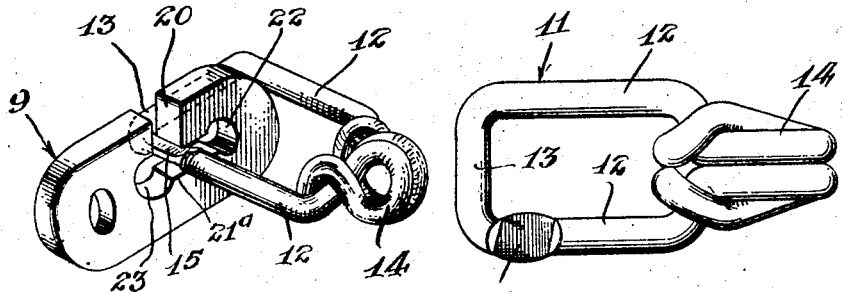
Figure 3 is a detail perspective view, showing how an interlocking link is introduced into the interlocking hook.
Figure 4:
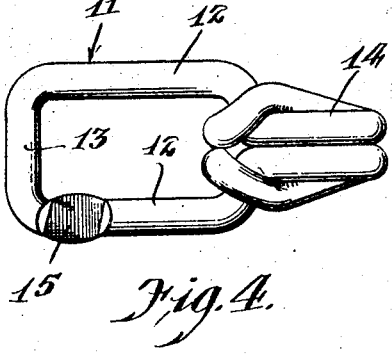
Figure 4 is a view in side elevation, showing one of the interlocking links employed in the side chains.

Referring to the drawings, the numeral 5 designates the side chains and the numeral 6 designates the cross chains.

The side chains 5 are made up of ordinary links 7, an end link 8, to which an interlocking link, designated generally at 9, is pivotally connected, as at 10. Each side chain 5 also includes a plurality of interlocking links, designated generally at 11. Each interlocking link 11 is formed of a single piece of heavy wire or rod metal which is sufficiently resilient or bendable to enable the link to be bent and formed as shown in the drawings and yet possess the requisite rigidity to enable the chain to fulfill its intended functions. As shown in the drawings, each link 11 includes a pair of side bars 12, an end bar 13 and an eye 14. The eyes 14 receive the end bars 13 of all of the links 11 except the link 11 at the end of the chain. One of the side bars 12 has a portion flattened, as indicated at 15. The flattened portions 15 are enlarged beyond the side portions of the bar 12 and in this manner the strength of the links 11 remain unimpaired since the flattening of the portions 15 still leaves the same amount of metal in the links. Preferably the flattened portions 15 occur adjacent the juncture of the side bars 12 with the end bars 13.

The interlocking hook 9 is constructed of an elongated and flat bar of metal having an opening 20 extending laterally from one side thereof to a point adjacent the center of the bar where the opening 20 communicates with a contracted throat 21 leading to a link seat 22. The opening 20 is enlarged adjacent the contracted throat 21 and is formed with a curved guide surface 23 which merges into a wall 21$^a$ of the throat 21. The contracted thoat 21 is too small to permit the passage of any portion of any of the interlocking links 11 except the flattened portion 15, and this throat 21 admits of the passage of the flattened portion 15 only when the narrowest edge of said flattened portion is presented thereto.

In assembling an interlocking link 11 with the interlocking hook 9, the end bar 13 of the link 11 is introduced through the opening 20 with its axis at right angles to the longitudinal axis of the hook and also at right angles to the plane of the side faces thereof. At this time the end bar 13 rests on the guide surface 23 and upon rotary movement of the link 11 in its plane and also forward movement thereof along the guide surface 23 the flattened portion 15 of the side bar 12 of the link will be presented to and passed through the contracted throat 21 to bring the link into the seat 22. The normal position of the link 11 which is engaged with the seat 22 of the hook is with its end bar 13 presented to the throat 21 whereby the link is held against accidental displacement from the seat 22. At the same time the link may be rotated and moved rearwardly to cause the flattened portion 15 to move through the throat 21 whereby to disengage the link 11 from the hook 9.

It is to be noted that a number of interlocking links 11 are provided adjacent the end of each side chain 5 whereby provision is made for the necessary take up occasioned by stretching of the chain and wear of the tire. If desired the side chains may be made up entirely of interlocking links having flattened portions 15 so that it will be practical to apply a large size chain to a small tire.

I claim:

In a tire chain, an interlocking hook having a seat, said interlocking hook having a lateral opening and also having a contracted throat leading from the lateral opening to the seat, there being a curved guide surface between the opening and the contracted throat, and an interlocking link including side bars and an end bar, the end bar extending transversely of and being engaged with the seat of the hook when the link and hook are interlocked, one of the side bars having a flattened portion adjacent the end bar, said flattened portion being adapted to pass through the contracted throat to permit the end bar to be engaged with the seat of the hook, the guide surface serving to facilitate the entrance of the flattened portion into the contracted throat.

RALPH SYLVESTER BLITZ.